United States Patent Office 2,988,462
Patented June 13, 1961

2,988,462
IMPREGNATING LIGNOCELLULOSE HARDBOARD WITH HYDROCARBON DRYING OILS
Harold Roy Hunt, Laurel, Miss., assignor to Masonite Corporation, Laurel, Miss., a corporation of Delaware
No Drawing. Filed Aug. 20, 1956, Ser. No. 605,209
2 Claims. (Cl. 117—143)

This invention relates to a process for refining hydrocarbon drying oils or resins of the type of the so-called "clay tower polymers" or "Gray" polymers. More particularly, the invention relates to a method of refining such drying oils by a selective solvent extraction procedure. The invention relates to the refining method, to the solvent refined products, and to the use of the products themselves.

In the thermal cracking of petroleum hydrocarbons, various gum-forming materials are produced and must be removed in order to yield a product of satisfactory stability. One of the most satisfactory methods is the Gray process in which cracked hydrocarbons are passed in the vapor phase through a bed of an active solid, such as one of various clays, at an elevated temperature. In the process, the gums and color bodies are polymerized and a highly unsaturated polymer is produced on the clay. The crude polymer, removed from the clay by suitable solvents, may be treated with steam to strip off the solvent. The product is known as a "reduced" clay polymer, the properties of which vary depending on the extent to which the low boiling constituents have been removed. The particular clay polymers with which the present invention is concerned are characterized by specific gravity of about 0.990, viscosity of about 100–250 seconds SSU at 210° F., iodine number of about 220–250, flash point of about 285° F., and are very dark brown colored.

Clay polymers are polycyclic polyolefins, principally tetracyclic triolefins containing, on the average, about 3.85 rings and 2.8 olefinic double bonds per molecule. The olefinic double bonds are present predominantly in the ring system and are mainly non-conjugated. The polymers resulting from the Gray process are of fairly high viscosity, have reasonably good drying properties, and have relatively low volatility. However, commercially available polymers are characterized by an undesirable odor, sometimes contain excessive amounts of suspended clay, and are unfortunately very dark colored.

Many attempts have been made to improve clay polymers by the employment of various polymerization and refining agents such as concentrated sulfuric acid or aluminum chloride. However, all of the previously suggested methods require extensive after-treatments and have uniformly been economically unfeasible.

It is an object of the present invention to provide a process for the treatment of clay polymers to effect a substantial refinement thereof.

Another object of the invention is to provide a commercially desirable one-step or continuous process for refining synthetic hydrocarbon drying resins of the type of clay polymers.

A further object of the invention resides in the provision of a relatively simple selective solvent method for refining clay polymers. These and other objects of the invention will become apparent from the following detailed description thereof.

It has been discovered, entirely unexpectedly, that a desirable fractionation of the above described clay polymers may be effected by employing acetone as the solvent. A large percentage of the polymers, representing the lower molecular weight material, is easily soluble in acetone. A smaller fraction, composed of very dark colored higher molecular weight material, is insoluble in acetone. The soluble fraction is a drying resin which is admirably adapted for use in the manufacture of lignocellulose hardboard. The so-refined drying resin is a clear, reddish colored liquid which is greatly improved, in all of its desired physical characteristics, over the relatively crude commercially available clay polymers.

The novel solvent extraction of the invention may be practiced by any one of several simply accomplished means. For example, a given volume of crude clay polymer may be mixed with from about 1 to about 10 volumes of acetone, allowed to sit for a short period of time, and the dissolved material may then be withdrawn. The undissolved fraction settles to the bottom of the mix and separation of the two layers is easily effected.

Another method of effecting the refining treatment comprises passing the mixture of polymer and acetone through a diffusing apparatus such as, for example, a colloid mill. The undissolved fraction thereafter separates immediately from the dissolved fraction. This refining treatment is therefore readily adapted to a continuous operation.

Still another method of effecting the solvent refining is a counter-current extraction operation wherein the acetone is the dispersed phase and the polymer is the continuous phase. In this type of treatment, the extraction column is filled with a polymer-rich acetone mixture which presents a single clear phase. Acetone is then admitted to the bottom of the column and passed upwardly through the polymer. The raffinate collects at the bottom and may be withdrawn continuously. Fresh polymer is added near the top of the column and travels downwardly. The desired acetone-soluble fraction is withdrawn continuously at the top of the column.

Regardless of the particular method employed, the physical properties of both the acetone soluble and acetone insoluble fractions indicate that substantially the same degree of refining is obtained. In accordance with normal expectation, a somewhat larger proportion of the clay polymers is soluble in hot acetone. Thus, for example, extraction of the polymer at a temperature of about 75°–80° F. results in a soluble fraction of about 65–75% of the crude material while extraction at about 125°–135° F. will produce about 80–88% soluble material.

The following table presents the physical properties of both the crude and the refined polymer.

Table I

| | Crude Clay Polymer | Acetone Extract | | Raffinate | |
|---|---|---|---|---|---|
| | | 130° F. | 75–80° F. | 130° F. | 75–80° F. |
| Specific Gravity @ 25° C | 0.990 | 0.996 | 0.990 | 1.002 | 1.007 |
| Viscosity—Seconds SSU @ 210° F | 211 | 110 | 76 | 600+ | |
| I₂ Number | 245 | 225 | 190 | 296 | 279 |
| Flash Point, ° F | 285 | 340 | 330 | | |
| Fire Point, ° F | 310 | 370 | 350 | | |

It will be seen from the foregoing that acetone, employed either hot or cold, serves as a selective solvent for clay polymers of the type hereinbefore described. The refined polymer, i.e. the acetone-soluble fraction, is characterized by a distinctly improved color and odor, and possesses desirable drying properties. Hardboard sheets may be impregnated with the acetone soluble fraction employing oil temperatures of about 240°–260° F. The impregnated sheets, containing about 5–8% of oil by weight, are then baked in suitable kilns for about 3–5 hours at temperatures of 280°–320° F. during which time the drying oil becomes polymerized. A small amount of a drying agent such as iron drier may also be employed where desired. For example, hardboard sheets impregnated with the refined polymer at about 250° F.

and baked for 4 hours at 300° F. had the following average physical properties as compared with the crude polymer and raffinate under identical conditions. In all samples the uptake of drying oil was about 6–6.5% of the dry weight of hardboard.

Table II

|  | Blank, No Oil | Crude Clay Polymer | Acetone Extract | | Raffinate |
|---|---|---|---|---|---|
|  |  |  | Hot | Cold |  |
| Specific Gravity | 0.998 | 1.03 | 1.03 | 1.03 | 1.03 |
| M.O.R. (p.s.i.) | 6,500 | 10,500 | 11,760 | 12,980 | 10,630 |

The data presented in Table II illustrates very clearly that the modulus of rupture, measured in pounds per square inch, of hardboard products is greatly enhanced by the refined drying oil of the invention. The boards treated with the raffinate fraction were also extremely brittle as was a cast film of the raffinate. These characteristics, in conjunction with the relatively high iodine number of the raffinate, indicate that this particular fraction of the clay polymer is composed mainly of high molecular weight highly unsaturated compounds. This deduction is further strengthened by the fact that the raffinate also bodies much quicker than the acetone soluble fraction and thus has a much shorter and less desirable vat life.

In brief, therefore, the method of the present invention presents to the art a decidedly advantageous means of refining clay polymers of the type hereinbefore described. The refined product is desirable as a so-called "tempering" drying oil in the manufacture of hardboard products. The refining method, itself, is simple, economical and commercially practicable. The invention therefore represents a decided advance in the art of refining clay polymers.

I claim:

1. A method for improving the physical properties of lignocellulose hardboard which comprises impregnating said hardboard with a refined hydrocarbon drying oil, said drying oil being the acetone soluble fraction of a clay polymer and having an iodine number of about 180–230 and a viscosity of about 70–120 seconds SSU at 210° F., the drying oil being maintained at about 240°–260° F. during said impregnation treatment, and thereafter baking the impregnated hardboard for about 3–5 hours at about 280°–320° F., said clay polymer from which the drying oil is extracted being characterized by specific gravity of about 0.990, viscosity of about 100–250 seconds SSU at 210° F., iodine number of about 220–250 and flash point of about 285° F.

2. A method for improving the physical properties of lignocellulose hardboard which comprises impregnating said hardboard with a refined hydrocarbon drying oil, said drying oil being the acetone soluble fraction of a clay polymer and having an iodine number of about 180–230 and a viscosity of about 70–120 seconds SSU at 210° F., the drying oil being maintained at about 250° F. during said impregnation treatment, and thereafter baking the impregnated hardboard for about 4 hours at about 300° F., said clay polymer from which the drying oil is extracted being characterized by specific gravity of about 0.990, viscosity of about 100–250 seconds SSU at 210° F., iodine number of about 220–250 and flash point of about 285° F.

References Cited in the file of this patent

UNITED STATES PATENTS

| 2,035,455 | Bjerregaard | Mar. 31, 1936 |
| 2,042,299 | Ellis | May 26, 1936 |
| 2,052,172 | Frohlich | Aug. 25, 1936 |
| 2,092,889 | Mikeska et al. | Sept. 14, 1937 |
| 2,161,599 | Towne | June 6, 1939 |
| 2,440,459 | Bloch | Apr. 27, 1948 |
| 2,702,761 | Mannheim | Feb. 22, 1951 |
| 2,703,293 | Boehm et al. | Mar. 1, 1955 |
| 2,726,192 | Kieras | Dec. 6, 1955 |

OTHER REFERENCES

Ellis: The chemistry of Synthetic Resins, pp. 118, 202, 229, vol. I and II (1935).

Dick et al.: Analysis of Sludges, July 1947, pp. 238–248, 66, Jour. Soc. Chem. Ind.